United States Patent Office 3,058,928
Patented Oct. 16, 1962

3,058,928
FOAMED SELF-EXTINGUISHING ALKENYL AROMATIC RESIN COMPOSITIONS CONTAINING AN ORGANIC BROMIDE AND PEROXIDE; AND METHOD OF PREPARATION
Jacob Eichhorn and Stanley I. Bates, Midland, Mich., assignors to The Dow Chemical Company, Midland, Mich., a corporation of Delaware
No Drawing. Filed Sept. 28, 1959, Ser. No. 842,559
15 Claims. (Cl. 260—2.5)

This invention concerns self-extinguishing plastic compositions and a method of making the same. It relates more particularly to moldable compositions comprising a flammable alkenyl aromatic polymer having a small proportion of one or more organic bromides and an organic peroxide incorporated therewith and pertains to self-extinguishing cellular or foamed articles prepared from alkenyl aromatic polymers.

This application is a continuation-in-part of our application Serial No. 750,558, filed July 24, 1958, now abandoned.

By an "alkenyl aromatic polymer" is meant a normally solid polymer of one or more polymerizable alkenyl aromatic compounds. Such polymer comprises in chemically combined form at least 70 percent by weight of at least one alkenyl aromatic compound having the general formula:

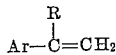

wherein Ar represents an aromatic hydrocarbon radical or an aromatic nuclear substituted halohydrocarbon radical of the benzene series, and R is hydrogen or the methyl radical. Examples of such alkenyl aromatic polymers are the solid homopolymers of styrene, ethylvinylbenzene, vinyltoluene, vinylxylene, isopropylstyrene, tert.-butylstyrene, ar-chlorostyrene, ar-dichlorostyrene; the solid copolymers of two or more of such alkenyl aromatic compounds with one another; and solid copolymers of one or more of such alkenyl aromatic compounds with minor amounts of another readily polymerizable olefinic compounds such as methylmethacrylate or acrylonitrile; or copolymers of one or more of such alkenyl aromatic compounds with from 2 to 10 percent by weight of natural or synthetic rubber.

The expression "self-extinguishing" as employed herein means incapable of burning or sustaining a flame for more than 20 seconds after a composition has been heated in an open flame and ignited and is then removed from the flame used to heat the same. In other words, the compositions of the invention are self-extinguishing in 20 seconds or less after removal from a flame used to heat and ignite the same.

It is known that the halogen content of halogenated organic compounds often has an effect of reducing the flammability both of the compound containing the halogen and of flammable organic materials intimately admixed therewith. It is also known that bromine-containing compounds possess, in most instances, a greater flame-retarding action than do corresponding chlorine-containing organic compounds. It is common practice to admix organic bromides, particularly polybromohydrocarbons, with combustible materials such as alkenyl aromatic polymers, e.g. polystyrene to render the polymer fire or flame retardant or self-extinguishing.

However, most organic bromide have an effect of impairing to some extent one or more of the properties, e.g., of reducing the tensile strength, impact strength or heat distortion temperature, of polystyrene and other alkenyl aromatic polymers when incorporated therewith in amounts that are required in most instances to render the polymer non-flammable or self-extinguishing. In general, an amount of from 1 to 10 usually from 3 to 5 percent by weight of an effective organic bromide is required to render polystyrene non-flammable or self-extinguishing, whereas lesser proportions, e.g. from 0.5 to 2 percent by weight of an organic bromide such as 1,1,2, 2-tetrabromoethane or 1,2-dibromo-1,1,2,2-tetrachloroethane, merely renders the polystyrene fire and flame retardant.

It has now been discovered that organic bromides, particularly organic bromides containing two or more bromine atoms attached to carbon atoms of an aliphatic or a cycloaliphatic radical, in admixture wtih an organic peroxide as a synergist are particularly effective agents for making non-flammable or self-extinguishing compositions from alkenyl aromatic polymers.

In accordance with the invention, improved flame retardant and self-extinguishing alkenyl aromatic polymers are provided which contain organic bromide flame-proofing agents in combination with an organic peroxide as a synergist, whereby the bromine-containing flame-proofing agent need be present in an amount which is substantially smaller than that normally required for flame-proofing the same polymer by the same flame-proofing agent to the same degree. The organic peroxide must be present in an amount which will produce a pronounced synergistic effect. Superior flame-proofing and self-extinguishing properties are obtained if the organic peroxide is one which is relatively insensitive to the effects of elevated temperatures, being also relatively stable against decomposition by such chemicals as acids, bases or catalysts promoting the decomposition of peroxides per se. The said chemicals or agents may be present in the polymer composition, or more often may be formed therein by partial decomposition of the polymer or of other components contained therein, e.g. plasticizers or the bromine-containing flame-proofing agents. Processing and shaping of thermoplastic polymers usually requires the application of elevated temperatures with the accompanying risk of destroying the organic peroxides contained therein.

In accordance with the invention, organic peroxides which are relatively stable as expressed by a half-life of at least two hours at 100° C. and for extreme heat-stability a half-life of from 5 to 15 hours or more at 100° C. are employed. The organic peroxides to be employed in the invention are organic peroxygen compounds having a half-life of at least two hours as determined in benzene at 100° C. and a boiling point, if liquid, of at least 100° C. at 760 millimeters absolute pressure, which peroxygen compound contains at least six carbon atoms in the molecule, has at least one tertiary carbon atom directly attached to an oxygen atom of the peroxy group and has the general formula:

$$R[O\!-\!O\!-\!R']_n$$

wherein R represents a member of the group consisting of (a) monovalent radicals of the class consisting of the acetyl, the benzoyl, alkyl radicals containing from 2 to 9 carbon atoms and aralkyl radicals of the formula:

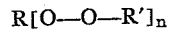

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

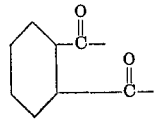

and

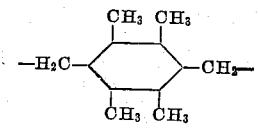

R' represents a member of the group consisting of hydrogen, alkyl radicals containing from 2 to 9 carbon atoms and aralkyl radicals of the mormula:

wherein $R_1$, $R_2$ and $R_3$ have the meaning given above, and $n$ is a whole number from 1 to 2, the value of $n$ being 1 when R is a monovalent radical and $n$ being 2 when R is a divalent radical.

Examples of organic peroxygen compounds included within the above general formula and which organic peroxides are operable in the invention are peroxy esters such as tert.-butyl peracetate, tert.-butyl perbenzoate, di-tert.-butyl diperphthalate and the like; hydroperoxides such as tert.-butyl peroxide, cumene hydroperoxide, p-phenylcumene hydroperoxide and p-methylcumene hydroperoxide, and symmetrical and unsymmetrical peroxides such as bis-(tert.-butyl peroxy methyl) durene,
cumyl ethyl peroxide,
di-tert.-butyl peroxide,
di-tert.-amyl peroxide,
cumyl tert.-butyl peroxide,
cumyl tert.-octyl peroxide,
cumyl isopropyl peroxide,
cumyl butyl peroxide,
dicumyl peroxide,
bis(alpha-methylbenzyl)peroxide,
bis(alpha-ethylbenzyl)peroxide,
bis(alpha-propylbenzyl)peroxide,
bis(alpha-isopropylbenzyl)-peroxide,
bis(alpha,alpha-dimethylbenzyl)peroxide,
bis(alpha-methyl-alpha-ethylbenzyl)peroxide,
bis(alpha,alpha-diethylbenzyl)peroxide,
bis(alpha,alpha-di-propylbenzyl)peroxide,
bis(alpha,alpha-diisopropylbenzyl)peroxide,
bis(alpha,alpha-p-methylbenzyl)peroxide,
bis(alpha-methyl-alpha-ethyl-p-methylbenzyl)peroxide,
bis(alpha,alpha-diethyl-p-methylbenzyl)peroxide,
bis(alpha,alpha-diisopropyl-p-methylbenzyl)peroxide,
bis(alpha,alpha-dimethyl-p-ethylbenzyl)peroxide,
bis(alpha-methyl-alpha-ethyl-p-ethylbenzyl)peroxide,
bis(alpha-diethyl-p-ethylbenzyl)peroxide,
bis(alpha-alpha-diisopropyl-p-ethylbenzyl)peroxide,
bis(alpha,alpha-dimethyl-p-isopropylbenzyl)peroxide,
bis(alpha-methyl-alpha-ethyl-p-isopropylbenzyl)peroxide,
bis(alpha, alpha-diethyl-p-isopropylbenzyl)peroxide,
bis(alpha,alpha-diisopropyl-p-isopropylbenzyl)peroxide,
bis(alpha,alpha-dimethyl-p-tert.-butylbenzyl)peroxide,
bis(alpha-methyl-alpha-ethyl-p-tert.-butylbenzyl)peroxide,
bis(alpha,alpha-diethyl-p-tert.-butylbenzyl)peroxide,
bis(alpha,alpha-diisopropyl-p-tert.-butylbenzyl)peroxide,
bis(alpha,alpha-dimethyl-p-pentamethylethylbenzyl)peroxide,
bis(alpha-methyl-alpha-ethyl-p-pentamethylethylbenzyl)peroxide,
bis(alpha,alpha-diethyl-p-pentamethylethylbenzyl)peroxide,
bis(alpha-alpha-diethyl-p-pentamethylethylbenzyl)peroxide,
bis(alpha,alpha-diisopropyl-p-pentamethylethylbenzyl)peroxide, and
bis(triphenylbenzyl)peroxide.

The alkenyl aromatic polymers are rendered non-flammable or self-extinguishing by intimately incorporating with the polymer and with one another from 0.2 to 5, preferably from 0.5 to 2, percent by weight of an organic bromide and from 0.05 to 2, preferably from 0.2 to 1.5, percent by weight of one or a mixture of two or more of the organic peroxides as synergist, per 100 parts by weight of the polymer.

The organic bromide and the organic peroxide in combination uniformly dispersed throughout the polymer have a synergistic action of rendering the polymer self-extinguishing which is not obtained by employing either the organic bromide or the peroxide alone in similar proportions under otherwise similar conditions. The employing of the peroxide together with the organic bromide permits the using of the organic bromide in proportions which alone are insufficient to render the alkenyl aromatic polymer self-extinguishing, but in combination with the organic peroxide are effective for making the polymer self-extinguishing.

It may be mentioned that in instances wherein the organic bromide alone is employed in amounts which render the polymer non-flammable or self-extinguishing, the compositions are rendered more resistant to ignition and burning by incorporating an organic peroxide therewith as synergist. In other words, the incorporating of organic peroxides with alkenyl aromatic polymer compositions containing organic bromides to reduce the flammability or burning of the polymer is advantageous even in compositions which are substantially non-flammable or self-extinguishing without the organic peroxide, since the combination of the organic peroxide in intimate admixture with the organic bromide has a synergistic action and enhances the nonflammable or self-extinguishing action of the organic bromide to prevent burning of the polymer.

The organic bromides which can be employed in the invention are organic bromides containing a plurality of bromine atoms in an aliphatic or a cycloaliphatic radical, these bromine atoms constituting at least 45 percent by weight of the molecule. The bromine atoms are preferably attached to adjacent or vincinal carbon atoms in an aliphatic or a cycloaliphatic radical, e.g. the cyclohexyl radical. The organic bromides can be formed by addition of bromine to an olefinic linkage or by the addition of bromine to the unsaturation of benzene, or by substitution of hydrogen for bromine, e.g. the bromination of aliphatic organic compounds. Examples of suitable organic bromides are methyl alpha,beta- dibromopropionate, tris-(2,3-dibromopropyl)phosphate, carbon tetrabromide, tetrabromoethylene, 1,2-dibromo-1,1,2,2-tetrachloroethane, 1,1,2,2-tetrabromoethane, dibromodichloromethane, 1,2-dibromo-1,1-dichloroethane, 1,2-dibromo-1,2,2-trichloroethane, 1,2,3,4-tetrabromobutane, 1,2,3,-tribromopropane, 1,2,4-tribromobutane, tetrabromopentane, pentabromoethane, hexabromoethane, 1,2-di-(dibromomethyl)benzene, alpha,beta-dibromoethylbenzene, hexabromocyclohexane, pentabromomonochlorocyclohexane, tetrabromodichlorocyclohexane and tribromotrichlorocyclohexane. The bromochlorocyclohexane compounds can be prepared by reaction of chlorine and bromine with benzene under the influence of actinic radiation, e.g. ultraviolet light or sunlight, employing procedure similar to that described in Bull. soc. chim. (France), pages 118–121 (1949).

The organic bromides can be employed in proportions corresponding to from 0.2 to 5, preferably from 0.5 to 2 percent by weight per 100 grams of the alkenyl aromatic polymer and together with the organic peroxide in amounts of from 0.05 to 2, preferably from 0.2 to 1.5, percent by weight of the polymer.

The minimum proportions of the organic bromide and the organic peroxide to be employed are dependent to a great extent upon the nature of the polymer and the organic bromide used, since the polymers vary considerably in their burning characteristics and the organic bromides differ among themselves as regards the flame-retarding action of the bromine contained therein, as is well-known. However, self-extinguishing alkenyl aromatic polymer compositions can be obtained employing both the organic bromides and the organic peroxides, and particularly dicumyl peroxide, in proportions within the ranges herein stated.

In accordance with the present invention, certain precautions should be observed in the preparation of the flame retardant and/or self-extinguishing polymers and/or articles therefrom. Many organic peroxides, such as most organic hydroperoxides and especially benzoyl peroxide, are not very stable and are subject to rapid decomposition upon exposure to elevated temperatures and/or to the action of certain chemicals and catalysts which often are present in the polymer compositions, or which alternatively are formed, e.g. by decomposition of the polymeric material or of the halogen containing flame-proofing agents. Some of the well-known flame-proofing agents have a tendency of splitting out hydrogen halides which, due to the acid reaction, deteriorate and decompose the unstable organic peroxides. Even traces of iron and other metals may have the undesirable effect of catalyzing the rapid decomposition of the unstable peroxides.

In order to produce a permanently flame-retardant or self-extinguishing effect in the polymer, it is desirable to either incorporate the peroxides after all the operations requiring the application of high temperatures have been performed, or in the alternative, by using only such peroxides which are relatively stable and not affected, or only moderately affected, by high temperatures and/or by decomposition catalysts.

A suitable indication of the heat stability of a peroxide can conveniently be obtained by subjecting solutions of the peroxide in a suitable organic solvent, preferably benzene, to elevated temperatures for various lengths of time and measuring the amount of peroxide left in the solution. This method has been described by D. F. Doehnert and O. L. Mageli, The Society Of The Plastics Industry, Inc. (preliminary copy of a report to be presented at the 13th annual meeting of the Reinforced Plastics Division). It has been found that organic peroxides which have a half-life of 2 hours or more at 100° C. can generally be applied with advantage in the present invention even if the polymer composition containing the peroxide is to be subjected to moderately elevated temperatures. Contemplated exposure to extremely high temperatures makes it desirable to select peroxides which have a longer half-life (at 100° C.) of, for instance, 5 hours, up to 15 hours, or more. Independently thereof, the possible catalytic effect of acids, bases, or metal ions, etc., which may be expected to be present or formed in the polymer compositions, must be considered in the half-life evaluation. The peroxide, which in itself may have a satisfactory half-life in a pure organic solvent, may not be suitable in a certain polymer composition because of its lacking stability against decomposition catalysts present therein.

The foregoing discussion shows that it is not necessarily sufficient to incorporate into a polymer a suitable amount of a given peroxide, in order to obtain the benefits of the present invention. Evidently, it is necessary that the required amount of peroxide is present in combination with the halogenated flame-proofing agent at the time when the polymer is subjected to the effect of heat, causing it to burn. For this reason, many peroxide polymerization catalysts which are generally used in the preparation of the polymers will not produce the favorable results of the present invention unless the precautions taught by the present invention are observed. This is due to the fact that nearly all commonly used polymerization catalysts are relatively unstable and thus have been completely, or nearly completely, destroyed during the steps leading to the finished polymers. Thus the incorporation of a flame-proofing agent in such polymers will not produce the results of the present invention.

The organic bromide and the organic peroxide can be incorporated with the polymer by any method which gives uniform distribution of the agents throughout the body of the polymer and which does not cause or result in appreciable deterioration or decomposition of either of said agents.

The organic bromide can be mixed with the molten polymer in a Banbury mixer or a plastics extruder or it can be dry blended with the solid polymer in granular form and dissolved when the mixture is melted during subsequent plastic working operations at elevated temperatures such as extrusion. In such blending operations the organic peroxide is mixed with the heat-plastified polymer containing the organic bromide at a temperature of 170° C. or lower, and below that which results in substantial decomposition of the peroxide and is mechanically worked at such temperature for a time which avoids appreciable decomposition of the peroxide. For example, in the case of dicumyl peroxide, a temperature not exceeding 170° C. and kneading of the heat-plastified polymer with the peroxide at said temperature for a time of not more than one minute is satisfactory to avoid substantial decomposition of the peroxide. Lower temperatures are advantageously employed. In an alternate procedure the alkenyl aromatic polymer, the organic bromide and the organic peroxide can be dissolved in a solvent, preferably a volatile solvent, such as methyl chloride, ethyl chloride, benzene, toluene, acetone, dioxane or the like, in the desired proportions and the solvent thereafter evaporated to recover the product.

The invention is advantageously employed for the production of self-extinguishing cellular plastic articles from thermoplastic alkenyl aromatic polymers. A suitable method for making cellular thermoplastic articles from alkenyl aromatic polymers is described in U.S. Patent No. 2,669,751. The method consists in feeding a solid granular alkenyl aromatic polymer, e.g. polystyrene, to a first section of a plastic extruder wherein is is pressed by flights of a forwarding screw and is heated to its melting temperature or thereabout. The molten polymer is forwarded in the barrel of the extruder through or around a sealing plate or disc on a mid-section of the screw, thereby forming a plastic seal against counter-current flow of gas through the barrel of the extruder, into a second mixing section of the extruder wherein it is mixed with a normally gaseous agent such as methyl chloride, dimethyl ether, butylene, propylene, ethyl chloride, methyl ethyl either or dichlorodifluoromethane, which is fed under pressure to the mixing section of the extruder. The resulting mixture is agitated, cooled and forwarded into a mixer cooler wherein the ingredients are throroughly blended, cooled and brought to a uniform temperature between 60° and 130° C., preferably from 90° to 110° C., under pressure, then is extruded through an orifice into a zone of sufficiently lower pressure, e.g. the atmosphere, to cause expansion of the extruded material with resultant formation of a cellular article.

In a preferred practice the invention is employed for the production of self-extinguishing cellular plastic articles from thermoplastic alkenyl aromatic polymers by forming a flowable gel consisting essentially of an alkenyl aromatic polymer having from 0.05 to 0.4 gram mole of a normally gaseous agent per 100 grams of the polymer, or from about 2.5 to 20 percent by weight of the normally gaseous agent, e.g. methyl chloride, dissolved therein under pressure, intimately mixing with the gel, under pressure, at a temperature below 170° C., preferably between 60° and 150° C., from 0.2 to 5, preferably from 0.5 to 2 percent by weight of an organic bromide having at least two bromine atoms in the molecule and having a plurality of bromine atoms attached to carbon atoms in an aliphatic or a cycloaliphatic radical, and in amount insufficient alone to render the foamed polymer self-extinguishing, and from 0.05 to 2 percent by weight of organic peroxide, based on 100 parts by weight of the polymer, while bringing the resulting flowable mixture under pressure to a temperature between 60° and 130° C., then extruding the material into a zone of sufficiently lower pressure to cause expansion of the extruded material with resultant formation of a cellular article.

In an alternate procedure the flowable gel can be formed from the alkenyl aromatic polymer, the normally gaseous agent and the organic bromide, in a suitable pressure resistant vessel and thereafter have the organic peroxide incorporated therewith at temperatures below 170° C., preferably within the range of from 60° to 150° C., then releasing the pressure as by extruding the material into a zone of lower pressure, e.g. the atmosphere, where it expands to form a cellular body.

The invention can be employed for the production of latent-foaming thermoplastic alkenyl aromatic polymer compositions which are normally solid materials resembling the solid polymer alone, but which compositions are capable of being foamed to form a self-extinguishing cellular body upon heating at elevated temperatures, e.g. to the softening point of the polymer or above, by procedure similar to that just described. In such procedure the heat-plastified alkenyl aromatic polymer is blended under pressure with a volatile organic compound such as a saturated aliphatic hydrocarbon containing from 4 to 7 carbon atoms in the molecule or a perchlorofluorocarbon having a molecular weight of at least 40 and boiling at a temperature below 95° C. at 760 millimeters absolute pressure, which volatile organic compound is a non-solvent for the polymer, but is soluble therein, to form a flowable gel which is preferably mixed with the organic bromide and the organic peroxide in the desired proportions at a temperature below 170° C., suitably at temperatures between 60° and 150° C., then is extruded into a zone of lower pressure, e.g. the atmosphere, and is rapidly cooled without appreciable expansion of the extruded material, to a temperature below 40° C. The cooled material is then cut or ground to a granular form, if desired. Such polymer compositions can be foamed to form cellular bodies of low density and having a predetermined shape, e.g. by heating of a mass of the granules of the foamable composition in a mold at temperatures above the softening point of the alkenyl aromatic polymer and above the boiling point of the volatile organic compound, then cooling the expanded polymer.

The following examples illustrate ways in which the principle of the invention has been applied, but are not to be construed as limiting its scope.

EXAMPLE 1

In each of a series of experiments, a granular molding grade polystyrene was fed at a rate of 200 pounds per hour to a plastic extruder wherein it was heat-plastified at temperatures between 220° and 240° C. and mixed with methyl chloride fed to a mixture and cooling section of the plastics extruder under pressure at a rate of from 10 to 12 pounds per hour. The resulting mixture was agitated, cooled and forwarded to a blender-cooler wherein the material under pressure was mixed with a solution of 1,1,2,2-tetrabromoethane and dicumyl peroxide fed to the blender-cooler at a rate corresponding to proportions based on the weight of the polystyrene as stated in the following table. The solution of the tetrabromoethane and dicumyl peroxide was fed to the blender-cooler and into admixture with the blend of the polystyrene and methyl chloride at a point where the temperature of the material was approximately 160° C. The resulting mixture was rapidly blended and cooled under pressure in the blender-cooler and brought to a uniform temperature between 93° and 98° C. throughout its mass, then was extruded through a discharge orifice into the atmosphere. The extruded material foamed or expanded to form a cellular body. Test pieces were cut from the foamed product and the bulk density, i.e. the weight in pounds per cubic foot of foam, was determined, other test pieces of the foamed product were tested for flammability. The procedure employed for determining the flammability of the foamed product was similar to that described in ASTM D635–44T. Table I identifies the experiments and gives the percent by weight of 1,1,2,2-tetrabromoethane and dicumyl peroxide fed to the blender-cooler, based on the weight, i.e. 100 parts by weight, of the polystyrene. The table also gives the density of the foamed product and its flammability, expressed as the time in seconds for which the foam sustained a flame after a test piece of the foamed composition has been heated in an open flame until ignited and then removed from the flame, i.e. the time to be self-extinguished.

*Table I*

| Run No. | Added Agents | | Foamed Product | |
|---|---|---|---|---|
| | 1,1,2,2-Tetra-bromo-ethane, percent | Dicumyl peroxide, percent | Density, lbs./cu.ft. | Time to be self-extinguished, sec. |
| 1 | 2 | 0.2 | 1.9 | 3 |
| 2 | 2 | 0.35 | 1.9 | 2 |
| 3 | 2 | 0.5 | 1.95 | 1 |
| 4 | 1 | 0.5 | 1.87 | 3 |
| 5 | 1 | 0.35 | 1.87 | 5 |
| 6 | 1 | 0.2 | 1.95 | 6 |
| 7 | 0.5 | 0.5 | 1.88 | 4 |

EXAMPLE 2

In each of a series of experiments, a granular molding grade polystyrene was fed to a plastics extruder at a rate of 30 pounds per hour, together with 0.8 percent by weight of finely divided calcium silicate and 0.2 percent of zinc stearate, wherein the polystyrene was heat-plastified and mixed at a temperature of 165° C. with methyl chloride fed under pressure to the extruder at a rate of 3 pounds per hour, together with 0.6 pound per hour of 1,1,2,2-tetrabromoethane and dicumyl peroxide in amount as stated in the fololwing table. The resulting mixture was rapidly blended and cooled under pressure in the extruder to a temperature of 100° C., then was extruded as a gel into the atmosphere, wherein it foamed to a cellular body. Test pieces were cut from the foamed product and were tested employing procedures similar to those employed in Example 1. Table II identifies the experiments and gives the proportions of the added agents and the flammability of the foamed product.

*Table II*

| Run No. | Added Agents | | Foamed Product | |
|---|---|---|---|---|
| | 1,1,2,2-Tetra-bromo-ethane, percent | Dicumyl peroxide, percent | Density, lbs./cu.ft. | Time to be self-extinguished, sec. |
| 1 | 2 | 0 | 2 | Burns |
| 2 | 2 | 0.2 | 2 | 3 |
| 3 | 2 | 0.4 | 2 | 3 |
| 4 | 2 | 0.8 | 2 | 1 |

EXAMPLE 3

A foamed polystyrene was prepared by procedure similar to that described in Example 2, employing 2 percent by weight of pentabromomonochlorocyclohexane and 0.5 percent of dicumyl peroxide as the added agents. The foamed product was self-extinguishing in 2 seconds. In contrast, foamed polystyrene containing 2 percent by weight of the pentabromomonochlorocyclohexane alone, burned. The pentabromomonochlorocyclohexane employed in the experiment was a white crystalline solid melting at 200°–201° C.

EXAMPLE 4

A charge of 100 parts by weight of molding grade polystyrene, 2 parts of 1,1,2,2-tetrabromoethane and 1 part of dicumyl peroxide was dissolved in 1000 parts by weight of methyl chloride. The solvent was allowed to evaporate, after which the residue was heated at 50° C. and 100 mm. absolute pressure for a period of 16 hours. The product was a porous mass having a density corresponding to 18.7 pounds per cubic foot. A test piece of the product having the dimensions of ¼ x ¼ inch cross section by 1½ inches long was held with one end in an open flame until ignited, then removed from the flame. The flame was self-extinguished in one second.

EXAMPLE 5

A charge of 100 parts by weight of a resinous copolymer of 70 percent by weight of styrene and 30 percent of acrylonitrile, 2 parts by weight of 1,1,2,2-tetrabromoethane and 0.5 part of dicumyl peroxide, was dissolved in methyl chloride. The solvent was evaporated. The product was recovered and tested for flammability employing procedures similar to those employed in Example 4. The product when ignited and removed from the flame was self-extinguished in 10 seconds. In contrast, a composition of the copolymer and 2 percent of 1,1,2,2-tetrabromoethane alone, burns when ignited and removed from the flame.

EXAMPLE 6

In each of a series of experiments, a charge of 100 parts by weight of a molding grade polystyrene and 1,1,2,2-tetrabromoethane, together with dicumyl peroxide, in proportions based on the weight of the polystyrene as stated in the following table was dissolved in methyl chloride. The solvent was evaporated. The product was recovered and tested for flammability employing procedures similar to those employed in Example 4. Table III identifies the experiments and gives the proportions of the added agents mixed with the polystyrene. The table also gives the flammability of the product.

*Table III*

| Run No. | 1,1,2,2-Tetrabromoethane, percent | Dicumyl peroxide, percent | Time to be self-extinguished, sec. |
|---|---|---|---|
| 1 | 2 | 0 | Burns |
| 2 | 2 | 0.05 | 5 |
| 3 | 2 | 0.2 | 1 |
| 4 | 1 | 0.1 | 2 |
| 5 | 1 | 0.2 | 2 |
| 6 | 1 | 0.5 | 1 |
| 7 | 0.5 | 0.3 | 2 |
| 8 | 0.5 | 0.5 | 1 |
| 9 | 0.2 | 0.5 | 4 |
| 10 | .2 | 1.0 | 1 |
| 11 | 0.1 | 1.0 | Burns |

EXAMPLE 7

A charge of 100 grams of a copolymer of 72 percent by weight of styrene and 28 percent of methyl methacrylate was intimately mixed with 2 grams of 1,1,2,2-tetrabromoethane and 0.5 gram of dicumyl peroxide employing procedure similar to that employed in Example 4. The composition when ignited was self-extinguished in 2 seconds.

EXAMPLE 8

A charge of 100 grams of a copolymer of 75 percent by weight of styrene and 25 percent of alpha-methyl styrene was mixed with 1 gram of 1,1,2,2-tetrabromoethane and 0.5 gram of dicumyl peroxide employing procedure similar to that employed in Example 4. The composition after igniting was self-extinguished in 2 seconds.

EXAMPLE 9

This example shows the preparation of self-extinguishing compositions from polystyrene and small amounts of the organic bromides and the dicumyl peroxide which are required by the invention. For comparative purposes, it also includes experiments outside the scope of the invention in which the dicumyl peroxide is omitted in attempt to make non-flammable polystyrene and shows that the products obtained in these instances are flammable, i.e. they burn and sustain a flame. The procedure in making the polystyrene compositions of this example was to dissolve 100 parts by weight of a molding grade polystyrene in 1000 parts by weight of methyl chloride, then add to the solution or gel the organic bromide and/or dicumyl peroxide in proportions as stated in the following table, and stir the resulting mixture to uniformly incorporate the materials with one another. Thereafter, the solvent was allowed to evaporate at room temperature and atmospheric pressure. The residue was heated at a temperature of 50° C. under 100 millimeters absolute pressure for a period of 16 hours. The product was obtained as a porous mass having a density of about 18 pounds per cubic foot of the material. Test pieces having the dimensions ¼ x ¼ inch cross-section by 1½ inches long were cut from the product. These test pieces were used to determine the flammability or self-extinguishing characteristics of the product by holding a test piece in a horizontal position with one end in an open flame until ignited, then removing the flame. Table IV names the organic bromide employed for each experiment and gives its proportion based on the weight of the polystyrene used. The table also gives the proportion of the dicumyl peroxide used, based on the weight of the polystyrene. The table indicates whether the products burn and sustain a flame or whether they are self-extinguishing, and gives the time in seconds after removal of the flame until the flame is self-extinguished. The table also indicates which of the experiments are in accordance with the invention and which are outside the invention.

*Table IV*

| Run No. | In accord with invention | Organic Bromide | | Dicumyl peroxide, percent | Time to be self-extinguished, sec. |
|---|---|---|---|---|---|
| | | Kind | percent | | |
| 1 | yes | carbon tetrabromide | 2 | 0.5 | 1 |
| 2 | no | ---do--- | 2 | 0 | Burns |
| 3 | yes | tetrabromoethylene | 2 | 0.5 | 1 |
| 4 | no | ---do--- | 2 | 0 | Burns |
| 5 | yes | 1,2-dibromo-1,1-dichloroethane | 1 | 0.5 | 1 |
| 6 | yes | pentabromoethane | 1 | 0.5 | 2 |
| 7 | yes | hexabromoethane | 1 | 0.5 | 2 |
| 8 | yes | 1,2,3,4-tetrabromobutane | 1 | 0.5 | 2 |
| 9 | yes | pentabromomonochlorocyclohexane | 1 | 0.5 | 1 |
| 10 | no | ---do--- | 1 | 0 | Burns |
| 11 | yes | 1,2-dibromo-1,1,2,2-tetrachloroethane | 0.5 | 0.5 | 1 |
| 12 | yes | ---do--- | 1 | 0.2 | 1 |
| 13 | no | ---do--- | 1 | 0 | Burns |
| 14 | yes | tris-(2,3-dibromopropyl)phosphate | 1 | 0.5 | 4 |
| 15 | yes | ---do--- | 2 | 0.5 | 1 |
| 16 | no | ---do--- | 2 | 0 | Burns |
| 17 | yes | methyl alpha,beta-dibromopropionate | 2 | 0.5 | 1 |

EXAMPLE 10

Polystyrene having a viscosity characteristic of 28 centipoises (determined for a 10 weight percent solution of the polystyrene in toluene at 25° C.) was fed to a plastics extruder at a rate of 34 pounds per hour, whereing it was heat-softened at temperatures between 160° and 180° C. and was mixed with n-pentane fed under pressure into a mixing section of the extruder at a rate of 2 pounds per hour. The materials were mixed and cooled under pressure in the mixing section of the extruder, and were forwarded at a temperature of 135° C. to a blender-cooler. Just prior to entering the blender-cooler the stream of the polystyrene and n-pentane under pressure was mixed with 2 percent by weight of 1,1,2,2-tetrabromoethane and 0.5 percent by weight of dicumyl peroxide, based on the weight of the polystyrene, which materials were fed into admixture with the steam of the polystyrene and n-pentane under pressure and at rates of 0.68 pound per hour of the tetrabromoethane and 0.17 pound per hour of the dicumyl peroxide, respectively. The resulting mixture was blended into a uniform composition in the blender-cooler under a pressure of about 800 pounds per square inch gauge pressure, and was discharged or extruded through a die plate, having 1/16 inch diameter drill holes, at a temperature of 122° C. into the atmosphere. The extruded strands of the material were almost immediately immersed in water at temperatures between 25° and 30° C. and were cooled, then drawn over guide rolls into a cutting device wherein the cooled strands were cut to a granular form. The product was a latent-foaming polystyrene composition, i.e. it expanded upon heating to the softening point of the polystyrene to form a cellular product composed for the most part of individually-closed thin-walled cells. A portion of the granular product was placed in a perforated mold and was foamed to form a cellular block having the dimensions of 12 x 12 inches by 2 inches thick. The foamed product had a density of 2 pounds per cubic foot of the foamed material. Test pieces having the dimensions ¼ x 1 inch cross-section by 6 inches long were cut from the foamed product. The test pieces were used to determine a flammability characteristic for the foamed product. The foam, when ignited in an open flame then removed from the flame was self-extinguished in 9 seconds.

EXAMPLE 11

A charge of 100 parts by weight of molding grade polystyrene, 1 part of 1,1,2,2-tetrabromoethane and 0.5 part of bis-(tert.-butyl peroxy methyl)durene was dissolved in 1000 parts by weight of methyl chloride. The solvent was allowed to evaporate, after which the residue was heated at 50° C. and 100 mm. absolute pressure for a period of 16 hours. The product was a porous body having a density of about 18 pounds per cubic foot. A test piece of the product having the dimensions of ¼ x ¼ inch cross-section by 1½ inches long was held with one end in an open flame until ignited, then removed from the flame. The flame was self-extinguished in 3 seconds.

EXAMPLE 12

In each of a series of experiments, a granular molding grade polystyrene was blended by tumbling with 0.4 percent by weight of finely divided calcium silicate, 0.2 percent of barium stearate and 1.5 percent of monochloropentabromocyclohexane, based on the weight of the polystyrene. The mixture was fed to a plastics extruder at a rate of 30 pounds per hour, wherein the polystyrene was heat-plastified and mixed at a temperature of 165° C. with methyl chloride fed under pressure to the extruder at a rate of 3 pounds per hour. The resulting mixture was rapidly blended under pressure and cooled to a temperature of about 100° C., then was mixed with a small amount of a 50 weight percent solution of an organic peroxide dissolved in methyl chloride and fed to the mixing and cooling section of the extruder under pressure. The resulting mixture was blended into a uniform mobile gel under pressure in the mixing and cooling section of the extruder then was extruded into the atmosphere wherein it foamed to produce a cellular body. Test pieces were cut from the foamed product and were tested for self-extinguishing characteristics employing procedures similar to those employed in Example 1. Table V identifies the experiments, names the organic peroxy compounds employed as synergist and gives the proportion used, based on the weight of the polystyrene. The table also gives the self-extinguishing time in seconds determined for the foamed product.

Table V

| Run No. | Added Agents | | | Foamed product, Time to be self-extinguished, sec. |
|---|---|---|---|---|
| | Organic bromide, percent | Organic Peroxide | | |
| | | Kind | percent | |
| 1 | 1.5 | Dicumyl peroxide | 0.52 | 3.5 |
| 2 | 1.5 | ___do___ | 0.96 | 1.5 |
| 3 | 1.5 | Di-tert.-butyl peroxide | 0.48 | 4.5 |
| 4 | 1.5 | ___do___ | 0.96 | 3.5 |
| 5 | 1.5 | tert.-Butyl hydroperoxide | 0.48 | 7.0 |
| 6 | 1.5 | ___do___ | 0.96 | 5.0 |
| 7 | 1.5 | Cumene hydroperoxide | 0.48 | 8.0 |
| 8 | 1.5 | ___do___ | 0.96 | 4.5 |
| 9 | 1.5 | tert.-Butyl peracetate | 1.04 | 5.2 |
| 10 | 1.5 | tert.-Butyl perbenzoate | 0.48 | 10.0 |
| 11 | 1.5 | ___do___ | 0.96 | 5.0 |
| 12 | 1.5 | Di-tert.-butyldiperphthalate. | 1.04 | 3.0 |

We claim:
1. A process for making a fire and flame retardant thermoplastic composition which comprises forming under pressure a flowable gel consisting essentially of a normally solid thermoplastic polymer containing in chemically combined form at least 70 percent by weight of at least one alkenyl aromatic compound having the general formula:

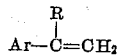

wherein Ar represents an aromatic radical of the group consisting of hydrocarbon and halohydrocarbon radicals of the benezene series and R represents a member of the group consisting of hydrogen and the methyl radical, from 0.2 to 5 percent, based on the weight of the polymer, of an organic bromide having a plurality of bromine atoms attached to a radical selected from the group consisting of the cyclohexyl and aliphatic radicals, these bromine atoms constituting at least 45 percent by weight of the organic bromide, and from 0.05 to 0.4 gram molecular proportion of a volatile organic compound per 100 grams of the polymer, said volatile organic compound having a boiling point below 95° C. at 760 millimeters absolute pressure, and intimately incorporating an organic peroxide with the gel at a temperature below 170° C. and below that which results in substantial decomposition of the organic peroxide, in an amount corresponding to from 0.05 to 2 percent, based on the weight of the polymer, said organic peroxide having a half-life of at least 2 hours as determined in benzene at 100° C., then extruding the gel into a zone of lower pressure.

2. A process for making a polymeric composition capable of being foamed to form a self-extinguishing cellular article, which comprises forming under pressure a flowable gel consisting essentially of a thermoplastic polymer containing in chemically combined form at least 70 percent by weight of at least one alkenyl aromatic compound having the general formula:

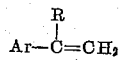

wherein Ar represents an aromatic radical of the group consisting of hydrocarbon and halohydrocarbon radicals of the benzene series and R represents a member of the group consisting of hydrogen and the methyl radical, from 0.2 to 5 percent, based on the weight of the polymer, of an organic bromide having a plurality of bromine atoms attached to a radical selected from the group consisting of the cyclohexyl and aliphatic radicals, these bromine atoms constituting at least 45 percent by weight of the organic bromide, and from 0.05 to 0.4 gram molecular proportion of a volatile organic compound per 100 grams of the polymer, said volatile organic compound having a boiling point below 95° C. at 760 millimeters absolute pressure, while at a temperature below the boiling point of the volatile organic compound under the conditions employed, and intimately incorporating an organic peroxide with the gel at a temperature below 170° C. and below that which results in substantial decomposition of the organic peroxide, in an amount corresponding to from 0.05 to 2 percent, based on the weight of the polymer, said organic peroxide having a half-life of at least 2 hours as determined in benzene at 100° C. and a boiling point of at least 100° C. at 760 millimeters absolute pressure, which organic peroxide contains at least 6 carbon atoms in the molecule, has at least one tertiary carbon atom directly attached to an oxygen atom of the peroxy group and has the general formula:

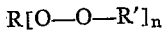

wherein R represents a member of the group consisting of (a) monovalent radicals of the class consisting of the acetyl radical, the benzoyl radical, alkyl radicals containing from 2 to 9 carbon atoms and aralkyl radicals of the formula:

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

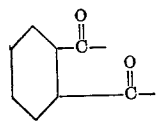

and

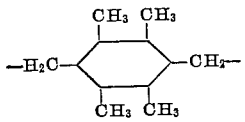

R' represents a member of the group consisting of hydrogen, alkyl radicals containing from 2 to 9 carbon atoms and aralkyl radicals of the formula:

wherein $R_1$, $R_2$ and $R_3$ have the meaning given above, and n is a whole number from 1 to 2, the value of n being 1 when R is a monovalent radical and n being 2 when R is a divalent radical, then extruding the gel at a temperature between 60° and 150° C., into a zone of lower pressure and cooling the extruded material to a temperature below 40° C. prior to appreciable expansion of extruded material.

3. A process for making a polymeric composition capable of being foamed to form a self-extinguishing thermoplastic cellular article, which comprises forming a flowable gel consisting essentially of polystyrene in intimate admixture with from 2.5 to 20 percent by weight of n-pentane and from 0.2 to 2 percent by weight of pentabromomonochlorocyclohexane, and insufficient alone to render the foamed polystyrene self-extinguishing, under pressure at temperatures between 160° and 240° C., intimately incorporating with the gel under pressure at a temperature below 170° C. from 0.05 to 2 percent by weight of dicumyl peroxide based on the weight of the polystyrene, then extruding the gel at a temperature between 60° and 150° C. into a zone of lower pressure and cooling the extruded material to a temperature below 40° C. prior to appreciable expansion of said extruded material.

4. A process for making a self-extinguishing cellular article which comprises forming under pressure a flowable gel consisting essentially of a thermoplastic polymer containing in chemically combined form at least 70 percent by weight of at least one alkenyl aromatic compound having the general formula:

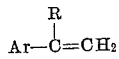

wherein Ar represents an aromatic radical of the group consisting of hydrocarbon and halohydrocarbon radicals of the benzene series and R represents a member of the group consisting of hydrogen and the methyl radical, from 0.2 to 5 percent, based on the weight of the polymer, of an organic bromide having a plurality of bromine atoms attached to a radical selected from the group consisting of the cyclohexyl and aliphatic radicals, these bromine atoms constituting at least 45 percent by weight of the organic bromide, and from 0.05 to 0.4 gram molecular proportion of a volatile organic compound per 100 grams of the polymer, said volatile organic compound having a boiling point below 95° C. at 760 millimeters absolute pressure, while at a temperature below the boiling point of the volatile organic compound under the conditions employed, intimately incorporating an organic peroxide with the gel at a temperature below 170° C. and below that which results in substantial decomposition of the organic peroxide, in an amount corresponding to from 0.05 to 2 percent, based on the weight of the polymer, said organic peroxide having a half-life of at least 2 hours as determined in benzene at 100° C. and a boiling point of at least 100° C. at 760 millimeters absolute pressure, which organic peroxide contains at least 6 carbon atoms in the molecule, has at least one tertiary carbon atom directly attached to an oxygen atom of the peroxy group and has the general formula:

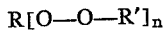

wherein R represents a member of the group consisting of (a) monovalent radicals of the class consisting of the acetyl radical, the benzoyl radical, alkyl radicals containing from 2 to 9 carbon atoms and aralkyl radicals of the formula:

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

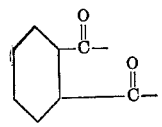

and

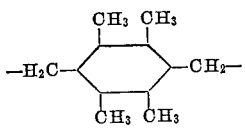

R' represents a member of the group consisting of hydrogen, alkyl radicals containing from 2 to 9 carbon atoms and aralkyl radicals of the formula:

wherein $R_1$, $R_2$ and $R_3$ have the meaning given above, and n is a whole number from 1 to 2, the value of n being 1 when R is a monovalent radical and n being 2 when R is a divalent radical, based on the weight of said alkenyl aromatic polymer, then extruding the gel at a temperature between 60° and 150° C. into a zone of sufficiently lower pressure to cause expansion of the extruded material with resultant formation of a cellular article.

5. A process as claimed in claim 4, wherein the alkenyl aromatic polymer is polystyrene.

6. A process as claimed in claim 4, wherein the volatile organic compound is methyl chloride.

7. A process as claimed in claim 3, wherein the organic peroxide is cumene hydroperoxide.

8. A process as claimed in claim 3, wherein the organic peroxide is tert.-butyl hydroperoxide.

9. A process as claimed in claim 3, wherein the organic peroxide is di-tert.-butyl peroxide.

10. A process as claimed in claim 3, wherein the organic peroxide is dicumyl peroxide.

11. A process as claimed in claim 3, wherein the organic peroxide is tert.-butyl peracetate.

12. A process as claimed in claim 3, wherein the organic peroxide is tert.-butyl perbenzoate.

13. A process as claimed in claim 3, wherein the organic peroxide is di-tert.-butyl diperphthalate.

14. A process as claimed in claim 3, wherein the organic peroxide is bis(tert.-butyl peroxy methyl)durene.

15. A process for making a self-extinguishing thermoplastic cellular article which comprises forming a flowable gel consisting essentially of polystyrene in intimate admixture with from 2.5 to 20 percent by weight of methyl chloride and from 0.2 to 2 percent by weight of pentabromomonochlorocyclohexane, and insufficient alone to render the foamed polystyrene self-extinguishing, under pressure at temperatures between 160° and 240° C., intimately incorporating with the gel under pressure at a temperature below 170° C. from 0.05 to 2 percent by weight of dicumyl peroxide based on the weight of the polystyrene, then extruding the gel at a temperature between 60° and 150° C. into a zone of sufficiently lower pressure to cause expansion of the extruded material with resultant formation of a cellular body.

References Cited in the file of this patent

UNITED STATES PATENTS

| | | |
|---|---|---|
| 2,681,321 | Stastny et al. | June 15, 1954 |
| 2,760,947 | Werkema et al. | Aug. 28, 1956 |

FOREIGN PATENTS

| | | |
|---|---|---|
| 554,602 | Great Britain | July 12, 1943 |

OTHER REFERENCES

Walling: "Free Radicals in Solution," published 1957 by Wiley and Sons, pages 61, 62, 472 and 473.